No. 762,649. PATENTED JUNE 14, 1904.
W. L. McCULLOUGH.
PIE MACHINE.
APPLICATION FILED SEPT. 14, 1903.
NO MODEL.
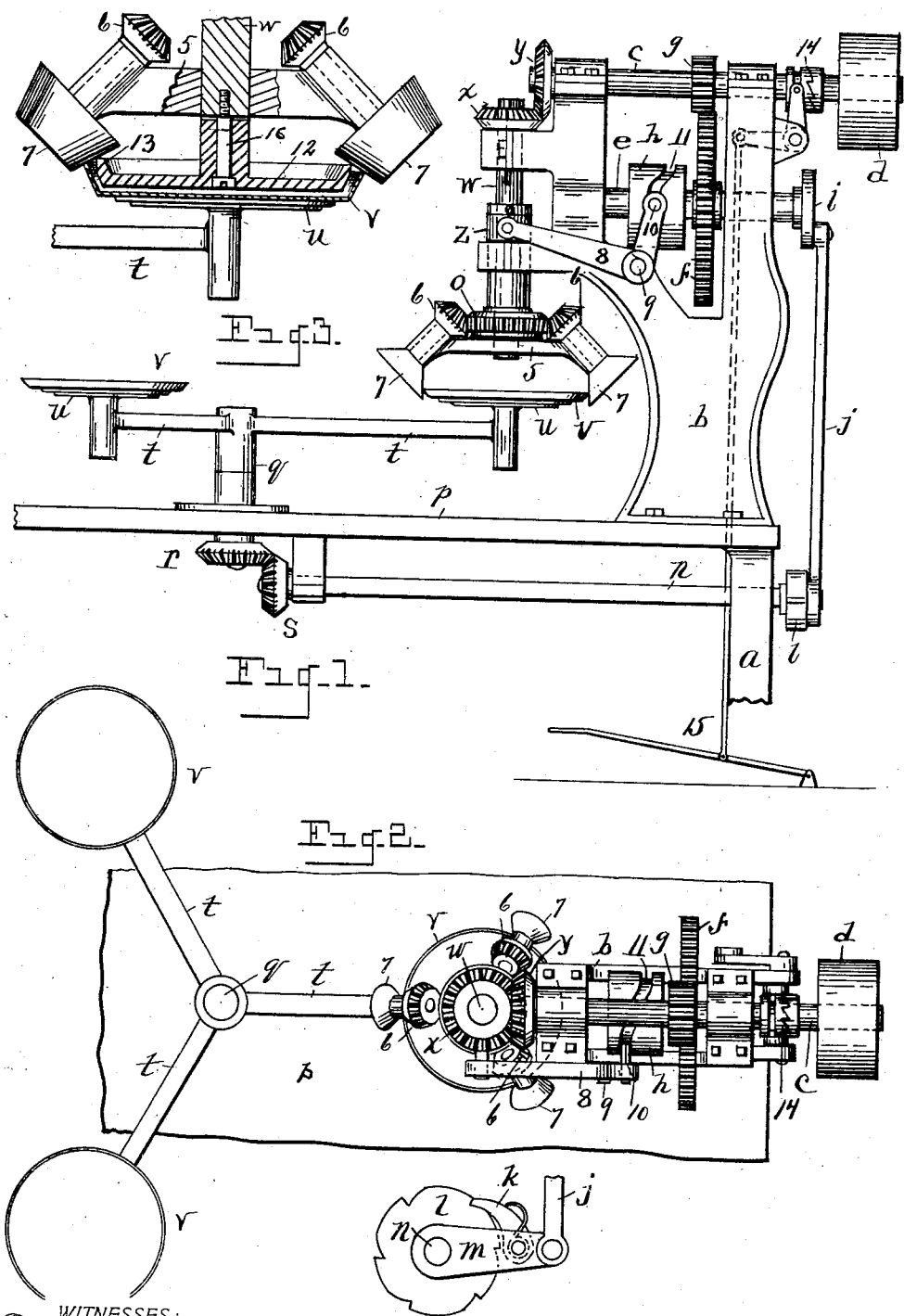
WITNESSES:
INVENTOR
William L. McCullough
BY
Newell S. Wright
ATTORNEY.

No. 762,649.  
Patented June 14, 1904.

UNITED STATES PATENT OFFICE.

WILLIAM L. McCULLOUGH, OF DETROIT, MICHIGAN, ASSIGNOR TO AUTOMATIC PIE MACHINERY CO., OF DETROIT, MICHIGAN, A CORPORATION OF MICHIGAN.

PIE-MACHINE.

SPECIFICATION forming part of Letters Patent No. 762,649, dated June 14, 1904.

Application filed September 14, 1903. Serial No. 173,053. (No model.)

*To all whom it may concern:*

Be it known that I, WILLIAM L. MCCULLOUGH, a citizen of the United States, residing at Detroit, county of Wayne, State of Michigan, have invented a certain new and useful Improvement in Pie-Machines, of which the following is a specification, reference being had to the accompanying drawings, which form a part of this specification.

My invention has for its object an improved pie-machine, the same having for its aim more particularly the trimming or rimming of the pie-crust at the edge of the plate.

My invention consists of the construction, combination, and arrangement of devices hereinafter described and claimed, and illustrated in the accompanying drawings, in which—

Figure 1 is a view in side elevation. Fig. 2 is a plan view. Fig. 3 is a view showing a detail of the invention and a modification thereof in vertical section and in elevation. Fig. 4 is a detail view, in side elevation, showing the ratchet mechanism.

The purpose of my invention is to provide a machine of the nature referred to above of superior utility—a machine capable of doing its work in a rapid, simple, and economical manner.

I carry out my invention as follows:

In the drawings, $a$ represents any suitable support, and $b$ is a supporting-frame mounted thereupon. A driving-shaft is indicated at $c$, driven from any suitable source of power, the same being shown provided with a driving-pulley $d$. The driving-shaft $c$ has its bearings in the frame $b$ and also a cam-shaft $e$, provided with a gear $f$, meshing with a pinion $g$ upon the driving-shaft. A rotatable cam $h$ is mounted upon the shaft $e$. The shaft $e$ is also provided with a crank $i$, with which is connected a rod $j$. A pawl $k$ actuates a ratchet-wheel $l$. The pawl $k$ is preferably carried upon an arm $m$, connected with the rod $j$, the arm being mounted upon the shaft $n$, upon which the ratchet-wheel $l$ is also mounted. Upon the bed $p$ of the support $a$ is mounted a rotatable shaft $q$, provided with a bevel-gear $r$, meshing with a bevel-gear $s$ upon the shaft $n$. Upon the shaft $q$ are mounted arms, each provided with a support $u$ for a pie plate or tin, (indicated at $v$.) I have shown three arms; but I would have it understood that I do not limit myself to any particular number thereof. When multiple arms are employed provided with means to support a pie plate or tin, said arms are rotatable, so as to carry the corresponding plates or tins successively about adjacent to the trimming or rimming mechanism with which the machine is provided. To accomplish this trimming or rimming of the pie crust or dough, I employ a vertical rotatable shaft $w$, provided with a bevel-gear $x$, meshing with a bevel-gear $y$ upon the driving-shaft $c$. The shaft $w$ has its bearings also in the frame $b$ and is provided with a non-rotatable sleeve $z$, having a non-rotatable gear $o$. The shaft $w$ is provided with a supporting-spider, (indicated by the numeral 5,) upon which are journaled shafts provided with bevel-gears 6, meshing with the gear $o$ upon the sleeve $z$. The shafts of the gears 6 are each provided at their lower ends with a rimmer 7. The spider 5 is rotatable with the shaft $w$, so that the rimmers 7 are carried in a circle about the outer edge of the pie plate or tin. The rimmers 7 rotating thereabout and thereagainst effectually trim or rim off the pie-crust at the outer edge thereof. In order to engage a pie plate or tin in place with the pie crust or dough thereupon, obviously either said plates or the mechanism for rimming or trimming the dough thereupon must be arranged to be vertically movable. I prefer to accomplish this end by making the shaft $w$, with the mechanism carried thereupon, vertically movable, so that it may be elevated when desired to carry the spider 5 and the rimmers 7 off from the pie plates or tins. To vertically reciprocate the shaft $w$, a bell-crank 8 is shown fulcrumed, as at 9, upon the frame $b$, one end thereof provided with a cam roll or pin 10, made to traverse a cam-groove 11 in the cam-wheel $h$. The opposite end of the bell-groove is suitably connected with the sleeve $z$. The ratchet-wheel $l$ is so constructed and arranged that the pawl $k$ will actuate said wheel so as to turn the shaft $q$ at proper intervals.

In making pies without an upper crust in order to hold the lower crust or dough in place in the act of being trimmed I employ a pincer 12, connected with the shaft $w$, constructed to project downward inside the lower pie-crust, the pincer being constructed, preferably, with the peripheral flange 13 to fit against the upturned flange of the pie tin or plate, so that rimmers 7 will bear thereagainst as well as against the edge of the pie tin or plate. By means of this pincer 12 it is evident that the lower crust will be held in proper place during the operation of trimming or rimming the same.

Any suitable clutch mechanism 14 may be employed controlled by a foot-lever 15 to govern the operation of the machine. The vertical shaft $w$ is preferably made reciprocatory through the bevel-gear $x$. The spider 5 being carried on the lower end of the shaft $w$ and rotatable therewith obviously carries the gears 6 about the stationary gear $o$. The operation of the device will now be understood. Normally the shaft $w$ will be raised, with the mechanism carried thereupon, to permit the ready insertion of a pie-plate upon the adjacent support $u$. The driving-shaft $c$ being then set in motion, the shaft $w$, with the mechanism carried thereupon, is forced downward, so as to bring the rimmers 7 against the edge of the pie-plate. When the operation of trimming has been accomplished, the shaft $w$ will be automatically elevated, permitting another pie-plate to be rotated into working position, this operation of bringing the successive pie-plates into working position being accomplished automatically through the instrumentality of the ratchet-wheel $l$.

The pincer 12 is shown connected with the shaft $w$ by a connecting-bolt 16, the pincer rotating freely upon the bolt, so that the pincer may be stationary when engaged upon the dough while the shaft $w$, with the rimmers, is being rotated. I do not limit myself to any particular number of the rimmers which are to be employed. Where the pincer 12 is used, I prefer to reverse the rimmers from the position shown, where the pincer is not employed; but I do not limit myself to any particular construction or shape of the rimmers themselves.

What I claim as my invention is—

1. In a pie-machine the combination of a support, a driving-shaft, a rimming mechanism actuated by the driving-shaft to traverse about the outer edge of the pie plate or tin, means to give a vertically-reciprocatory movement to the rimming mechanism, and a support for a pie plate or tin.

2. In a pie-machine the combination of a support, a driving-shaft journaled in said support, a driven shaft, rimming mechanism carried upon the driven shaft to traverse about the outer edge of the plate or tin, and a series of supports for pie plates or tins, and means to rotate the series of supports to bring each of the supports for the pie plates or tins adjacent to the rimming mechanism.

3. In a pie-machine the combination of a support, a driving-shaft, a vertically-reciprocatory driven shaft, rimming mechanism carried upon the driven shaft, and a support for a pie plate or tin.

4. In a pie-machine the combination of a support, a driving-shaft, a vertically-reciprocatory driven shaft provided with a spider at its lower end, a non-rotatable sleeve upon the driven shaft provided with a non-rotatable gear, shafts journaled in said spider geared with the stationary gear and provided with rimmers at their opposite ends, and means to support a pie plate or tin adjacent to said rims.

5. In a pie-machine the combination of a support, a driving-shaft, rimming mechanism actuated by the driving-shaft to traverse about the outer edge of the plate or tin, a horizontally-rotatable support for a pie plate or tin, and means actuated by the driving-shaft to rotate the support for the pie plate or tin.

6. In a pie-machine the combination of a support, a bed upon said support, a driving-shaft, a vertical reciprocatory driven shaft, rimming mechanism carried by the driven shaft, a sleeve upon the driven shaft to actuate the rimming mechanism, a support for the pie plate or tin upon said bed and means to automatically elevate the driven shaft and to rotate the support upon said bed.

7. In a pie-machine the combination of a support for a pie plate or tin, rimming mechanism traversable about the outer edge of the pie plate or tin, means to give a vertically-reciprocatory movement to the rimming mechanism and means to hold a pie-crust upon a tin or plate.

In testimony whereof I have signed this specification in the presence of two subscribing witnesses.

WILLIAM L. McCULLOUGH.

Witnesses:
N. S. WRIGHT,
M. L. SIMMONS.